(12) United States Patent
Garbagnati et al.

(10) Patent No.: US 6,343,689 B1
(45) Date of Patent: Feb. 5, 2002

(54) CHAIN CONVEYOR WITH A CHANNEL-SHAPED SLIDE-GUIDE

(75) Inventors: Carlo Garbagnati, Castello Brianza; Norberto Cattaneo, Cinisello Balsamo, both of (IT)

(73) Assignee: Regina Sud S.p.A., Borgo San Michele (IT)

( * ) Notice: Subject to any disclaimer, the term of this patent is extended or adjusted under 35 U.S.C. 154(b) by 0 days.

(21) Appl. No.: 09/557,409

(22) Filed: Apr. 24, 2000

(30) Foreign Application Priority Data

May 6, 1999 (IT) ........................ MI9900285 U

(51) Int. Cl.[7] ............................................. B65G 17/06
(52) U.S. Cl. .................................................... 198/853
(58) Field of Search ................................. 198/852, 853

(56) References Cited

U.S. PATENT DOCUMENTS 4,893,710 A    1/1990   Bailey et al. ............... 198/853
5,217,110 A  * 6/1993   Spangler et al. ............ 198/853
5,335,768 A  * 8/1994   Schladweiler ............... 198/853
5,586,644 A  * 12/1996  Coen et al. .................. 198/852

FOREIGN PATENT DOCUMENTS

EP          0739830 A1    10/1996

* cited by examiner

Primary Examiner—Joseph E. Valenza
(74) Attorney, Agent, or Firm—Jacobson Holman, PLLC

(57) ABSTRACT

A chain conveyor includes a slide-guide for a chain formed of articulated links, below which bodies for link articulation project within a channel. The articulation bodies for sequential links form a first seating to receive a hinged-connection pin. The pin and seating axes are directed transversely of the sliding direction of the chain on the slide-guide and the seating has an end opening facing a side wall of the channel and constituting the opening for introduction of the pin into the seating. The articulation bodies include a second seating which is close to the opening for introduction of the pin into the first seating and receives, by forced fitting, an insert which takes an interposed position between the pin end turned towards the side wall of the channel and the channel side wall itself.

7 Claims, 1 Drawing Sheet

CHAIN CONVEYOR WITH A CHANNEL-SHAPED SLIDE-GUIDE

BACKGROUND OF THE INVENTION

The present invention relates to a chain conveyor of the type comprising a transport chain running in a slide-guide having a central channel receiving the chain links. Known conveyors of this type have their articulated joints provided with hinging pins that are introduced thereinto through openings appearing on the link surfaces facing the side walls of the slide-guide channel. A problem of these known conveyors is that the pins can slip in their seatings, so that ultimately they will project from the introduction openings. Under these conditions, the channel wall is damaged and, in addition, the sliding friction of the conveyor is greatly increased. It is a general aim of the present invention to eliminate the above mentioned drawbacks, by providing a conveyor in which contact between the hinging pin ends and the channel wall is avoided.

SUMMARY OF THE INVENTION

In view of the above aim, in accordance with the invention a chain conveyor has been conceived which comprises a slide-guide for a chain formed of articulated links below which bodies for link articulation project within a channel of the slide-guide, the articulation bodies for sequential links forming a first seating to receive a pin for hinged connection of the links, the pin and seating axes being directed transversely of the sliding direction of the chain on the slide-guide and the seating having at least one end opening which faces a side wall of the channel and constitutes the opening for introduction of the pin into the seating, characterised in that the articulation bodies comprise a second seating close to the opening for introduction of the pin into the first seating, which second seating receives, by forced fitting, an insert which takes an interposed position between the pin end turned towards the side wall of the channel and the channel side wall itself.

BRIEF DESCRIPTION OF THE DRAWINGS

For better explaining the innovative principles of the present invention and the advantages it offers over the known art, a possible embodiment of the invention will be described hereinafter by way of non-limiting example, with the aid of the accompanying drawings. In the drawings.

DETAILED DESCRIPTION OF THE INVENTION

Figure 1:
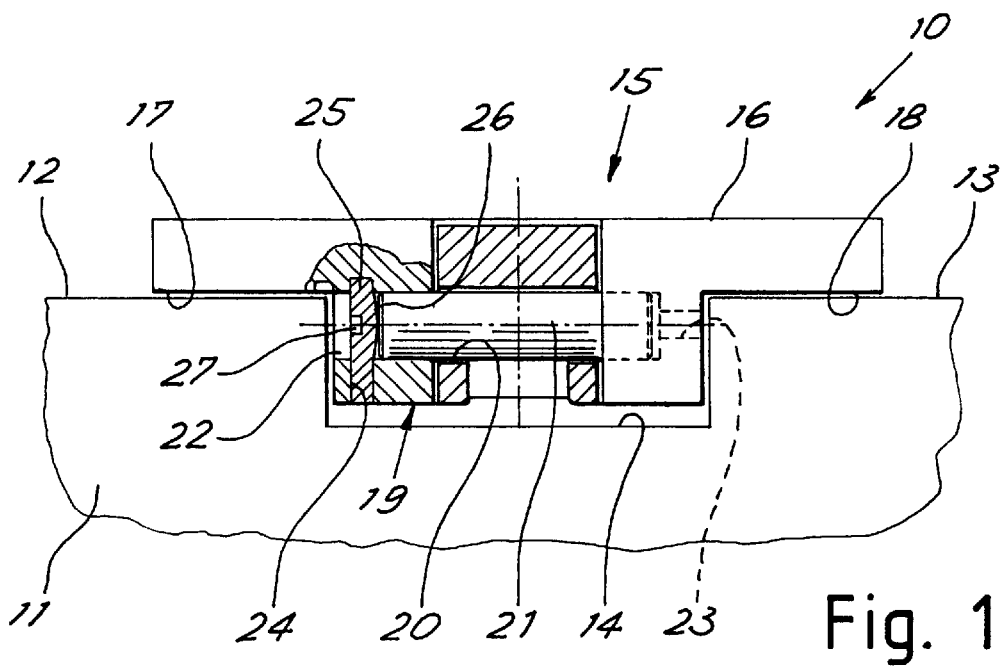
FIG. 1 is a partly sectioned view of the conveyor in accordance with the invention, taken along line I—I in FIG. 2.
Figure 2:
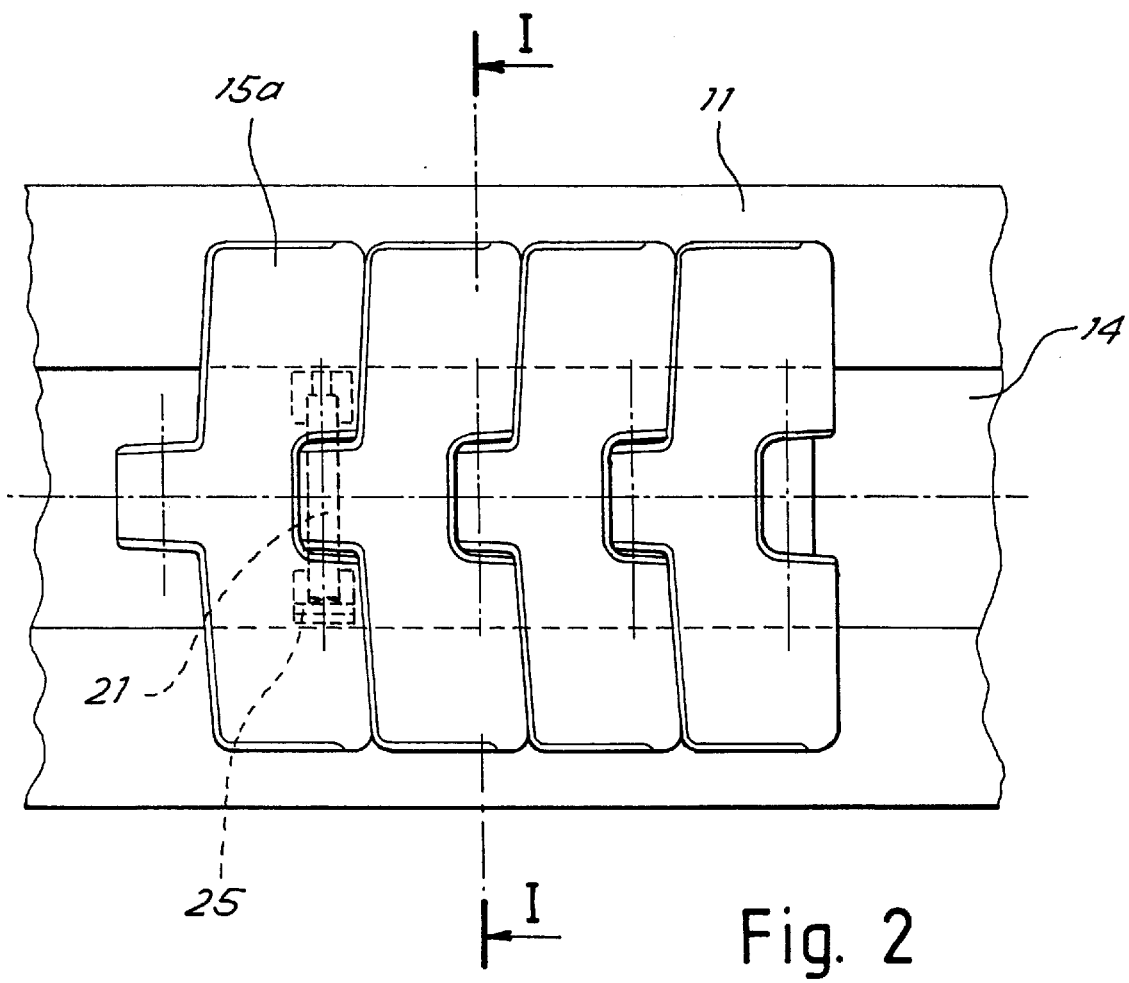
FIG. 2 is a partial top view of the conveyor in accordance with the invention.

With reference to the drawings, a chain conveyor generally denoted by 10 comprises a slide-guide 11 defining two upper sliding surfaces 12, 13 for a chain 15. The two surfaces 12, 13 are disposed at either side of a channel 14 in the slide-guide, which channel is parallel to the sliding direction of the chain. Chain 15 in turn comprises links 15a which define, at the upper part thereof, a conveying surface 16 and, at the lower part thereof, two side surfaces 17, 18 intended for running on the corresponding sliding surfaces 12, 13 of the slide-guide. Projecting between the sliding surfaces of the link in channel 14 are bodies 19 for mutual articulation of the links in engagement with each other. The articulation bodies of two sequential links form a seating 20 designed to receive a pin 21 for mutual hinged connection. The axes of pin 21 and the respective housing 20 are directed transversely of the sliding direction of the chain on the slide-guide and housing 20 has an end opening 22 facing the side wall of the channel. Opening 22 constitutes the opening for introduction of the pin into its housing. At its opposite end, the seating has a blind bottom, optionally with a narrow through hole 23. The articulation bodies comprise a second seating 24, close to the opening for introduction of the pin into the first seating 20, which is designed to receive, by forced fitting, an insert 25 thus interposed between the pin end turned towards the side wall of the channel and said side all.

In this way, after mounting of the pin for link engagement, introduction of the insert is sufficient to accomplish a protection shield preventing an undesirable contact between the pin and the channel side wall.

Advantageously, as viewed from FIG. 1, the insert seating 24 has the insert-introduction opening that opens towards the channel bottom.

For safe fitting of the insert into its seating, said insert is provided with at least one side projection 26 that, when the insert is in place in the second seating, juts out into the first seating 20.

To facilitate extraction of the insert, should pin removal be required to separate the chain, the insert has a notch 27 disposed on a surface thereof appearing on the side of the close end opening 22. Notch 27 constitutes a coupling recess for a tool (a screwdriver for example) that can be introduced through opening 22 to push the insert 25 out of its seating, by overcoming the forced-fitting resistance between the insert and seating. When the insert has been removed, introduction of an appropriate tool into hole 23 is sufficient to easily push the pin out of its seating. At this point it is apparent that the intended purposes have been achieved by providing the chain links with protection shields preventing contact between the pin and the channel side walls in the slide-guide.

Obviously, the above description of an embodiment applying the innovative principles of the present invention is given by way of example only and therefore must not be considered as a limitation of the scope of the invention as herein claimed. For instance, the conveyor can be of the magnetic type, with magnets introduced into the slide-guide to attract metallic parts of the chain (the pins for example) and keep the chain in place when bends are to be taken. The pin seating may also be open at both ends to the same extent, so that the pin can be introduced from one end or the other and an insert 25 can be provided at each end.

What is claimed is:

1. A chain conveyor comprising a slide-guide for a chain formed of articulated links below which bodies for link articulation project within a channel of the slide-guide, the articulation bodies for sequential links forming a first seating to receive a pin for hinged connection of the links, the pin and seating axes being directed transversely of the sliding direction of the chain on the slide-guide and the seating having at least one end opening facing a side wall of the channel and constituting the opening for introduction of the pin into the seating, the articulation bodies comprise a second seating close to the opening for introduction of the pin into the first seating, said second seating receiving, by forced fitting, an insert which takes an interposed position between the pin end turned towards the side wall of the channel and the channel side wall itself, the insert having a notch which is disposed on a surface thereof appearing on the side of the close end opening of the first seating and which is designed to constitute a coupling recess for a tool inserted through said close opening to push the insert out of its seating.

2. A conveyor as claimed in claim 1, wherein the second seating has the insert-introduction opening that opens towards the channel bottom.

3. A conveyor as claimed in claim 1, wherein the insert has a side projection that, when the insert is in place in its second seating, juts out into the first seating to ensure forced fitting of the insert in its seating.

4. A chain conveyor comprising a slide-guide for a chain formed of articulated links below which bodies for link articulation project within a channel of the slide-guide, the articulation bodies for sequential links forming a first seating to receive a pin for hinged connection of the links, the pin and seating axes being directed transversely of the sliding direction of the chain on the slide-guide and the seating having at least one end opening facing a side wall of the channel and constituting the opening for introduction of the pin into the seating, the articulation bodies comprise a second seating close to the opening for introduction of the pin into the first seating, said second seating receiving, by forced fitting, an insert which takes an interposed position between the pin end turned towards the side wall of the channel and the channel side wall itself, the first seating having a narrow passage turned outwardly in the axial direction of the pin and disposed at the seating end opposite to that for pin introduction.

5. A conveyor as claimed in claim 4, wherein the second seating has the insert-introduction opening that opens towards the channel bottom.

6. A conveyor as claimed in claim 4, wherein the insert has a side projection that, when the insert is in place in its second seating, juts out into the first seating to ensure forced fitting of the insert in its seating.

7. A chain conveyor comprising a slide-guide for a chain formed of articulated links below which bodies for link articulation project within a channel of the slide-guide, the articulation bodies for sequential links forming a first seating to receive a pin for hinged connection of the links, the pin and seating axes being directed transversely of the sliding direction of the chain on the slide-guide and the seating having at least one end opening facing a side wall of the channel and constituting the opening for introduction of the pin into the seating, said first seating having a narrow passage turned outwardly in the axial direction of the pin and disposed at the seating end opposite to that for pin introduction.

* * * * *